United States Patent
Corghi

(10) Patent No.: US 6,609,293 B2
(45) Date of Patent: Aug. 26, 2003

(54) DEVICE FOR OPERATING ON TIRES OF "SYSTEM PAX" TYPE

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 74 days.

(21) Appl. No.: 09/864,222

(22) Filed: May 25, 2001

(65) Prior Publication Data

US 2001/0054227 A1 Dec. 27, 2001

(30) Foreign Application Priority Data

Jun. 23, 2000 (IT) ........................ RE00A0069

(51) Int. Cl.⁷ ................................ B23P 19/00
(52) U.S. Cl. .................. 29/802; 29/894.3; 29/252; 29/426.5
(58) Field of Search ............... 29/802, 894.31, 29/894.37, 252, 235, 894.3, 426.5; 157/11, 1.3; 152/520

(56) References Cited

U.S. PATENT DOCUMENTS

| | | | |
|---|---|---|---|
| 1,944,767 A | * 1/1934 | Stevens | 264/315 |
| 3,837,064 A | * 9/1974 | Membre et al. | 29/235 |
| 4,050,144 A | * 9/1977 | de Massacre | 29/235 |
| 4,212,338 A | * 7/1980 | Tiemann | 152/158 |
| 4,251,906 A | * 2/1981 | Jacquemin | 29/235 |
| 5,634,993 A | 6/1997 | Drieux et al. | |
| 5,690,762 A | * 11/1997 | Bock et al. | 152/158 |
| 5,749,982 A | 5/1998 | Muhlhoff et al. | |
| 5,783,035 A | * 7/1998 | Pederson | 156/344 |
| 5,836,366 A | * 11/1998 | Muhlhoff | 152/379.3 |
| 5,891,279 A | * 4/1999 | Lacour | 152/381.5 |
| 6,286,574 B1 | * 9/2001 | Michelot et al. | 152/381.6 |

FOREIGN PATENT DOCUMENTS

| | | |
|---|---|---|
| FR | 92/15061 | 11/1992 |
| FR | 93/14702 | 12/1993 |
| FR | 2 699 121 | 6/1994 |
| JP | 11-115422 | 4/1999 |
| WO | 00 78567 | 12/2000 |

* cited by examiner

Primary Examiner—David P. Bryant
(74) Attorney, Agent, or Firm—Browdy and Neimark, P.L.L.C.

(57) ABSTRACT

A device for operating on tires comprising an outer carcass and an inner toroidal ring of deformable material; said device comprises a base which supports means for supporting the outer carcass of the tire, and movable means for extracting or inserting said ring from or into said carcass, said latter movable means being provided with at least one appendix arranged to interact with a portion of the edge of said ring.

8 Claims, 6 Drawing Sheets

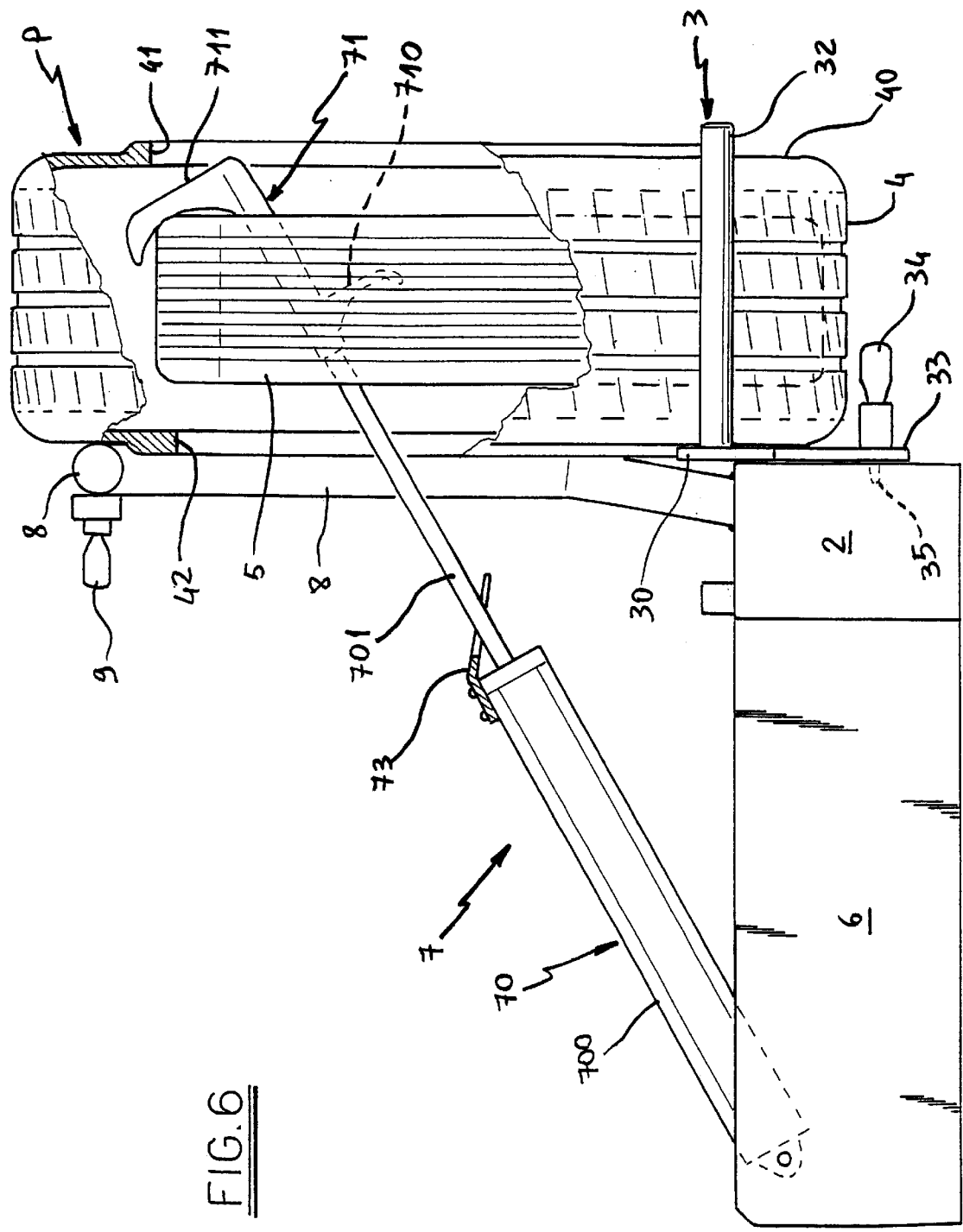

DEVICE FOR OPERATING ON TIRES OF "SYSTEM PAX" TYPE

This invention relates to a device for operating on those types of tire which enable the vehicle to travel even in the case of a puncture or of insufficient inflation pressure.

Tires of the stated type, such as so-called System Pax tires produced by the MICHELIN Company enable the vehicle to travel even when their inflation pressure is very low or close to zero.

These tires, which are described in French patent application FR 92/15061 and FR 93/14702, comprise not only the outer carcass but also a separate toroidal support ring of elastomer rubber, which is housed in an appropriate seat provided in the well of the wheel rim.

When the tire is removed from the wheel rim, said toroidal ring remains inside said outer carcass, hence to replace or repair the carcass said toroidal support ring has to be extracted and then reinserted.

To extract the ring from and then replace it into the outer carcass requires considerable force on the part of the operator, this force being mainly due to the rigidity of said elastomer ring and the rigidity of the carcass, and is also partly due to the uncomfortable position in which the operator is compelled to work.

The object of the present invention is to solve the stated drawbacks within the framework of a rational and reliable solution.

The invention attains said object by providing a device which enables the toroidal ring to be extracted from the carcass, and then reinserted therein, automatically without the operator needing to apply any physical force.

The device of the invention can be associated with a tire removal machine or be a separate accessory.

Said device comprises a lower base provided on one side with means for supporting in the correct working position the tire outer carcass from or into which said toroidal ring is to be extracted or inserted, and provided on the opposite side with means for extracting or inserting said toroidal ring. Said means for supporting the tire outer carcass are adjustable in height to enable the tire to be positioned in the correct working position.

Said means for extracting or inserting said toroidal ring comprise a pneumatic or hydraulic cylinder-piston unit, with the rod of which there is associated at least one tool provided with at least one appendix for gripping the edge of said ring.

In a preferred embodiment said rod presents two appendices for gripping the edge of said ring, one provided to grip the edge of said ring only during its extraction from the tire outer carcass, and the other provided to grip said ring only during its insertion into the tire outer carcass.

The special characteristics of the invention are stated in the claims.

The operational and constructional characteristics of the invention will be apparent from the ensuing description of a preferred embodiment thereof given by way of non-limiting example and illustrated on the accompanying drawings.

FIG. 6 is a partly cut-away side view of the device of the invention on termination of insertion of the toroidal ring into the tire carcass.

Figure 1:
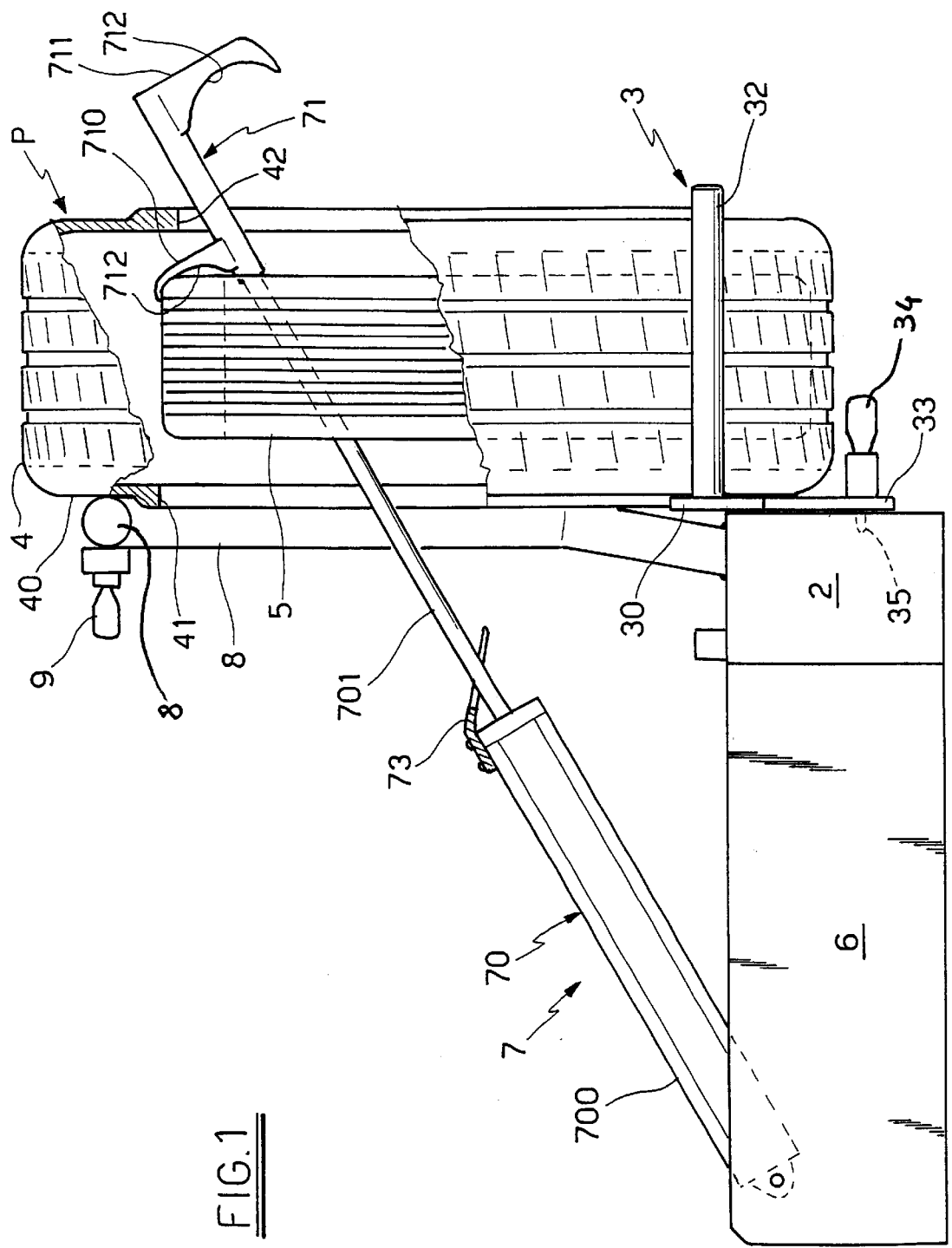
FIG. 1 is a partly cut-away side view of the device of the invention.

Said figures show the device 1, which comprises a base 2 of parallelepiped shape, provided to its right with the means 3 for supporting the tire P of SYSTEM PAX type produced by the MICHELIN Company, comprising the carcass 4 and the separate toroidal ring 5 of elastomer rubber, located inside it.

On the opposite side of said base 2 there is fixed a U-shaped support 6 which supports means 7 for extracting or inserting said ring 5.

From the upper side of said base 2 there upwardly projects an abutment element which in the illustrated example consists of an L-shaped tubular element 8, against which the sidewall 40 of the tire rests during the extraction and insertion of said ring 5.

Figure 3:
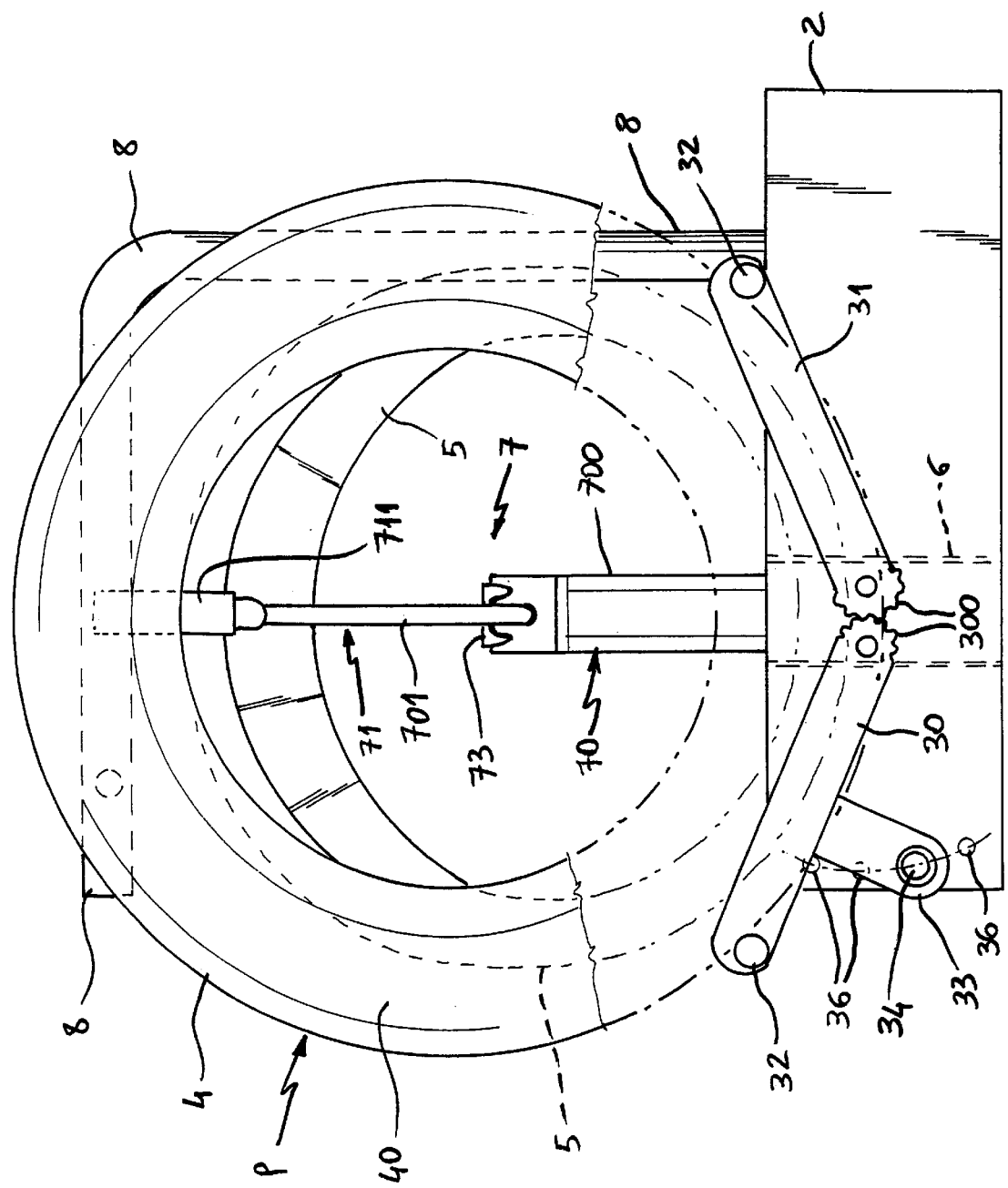
FIG. 3 is a view of FIG. 2 taken from III.
Figure 4:
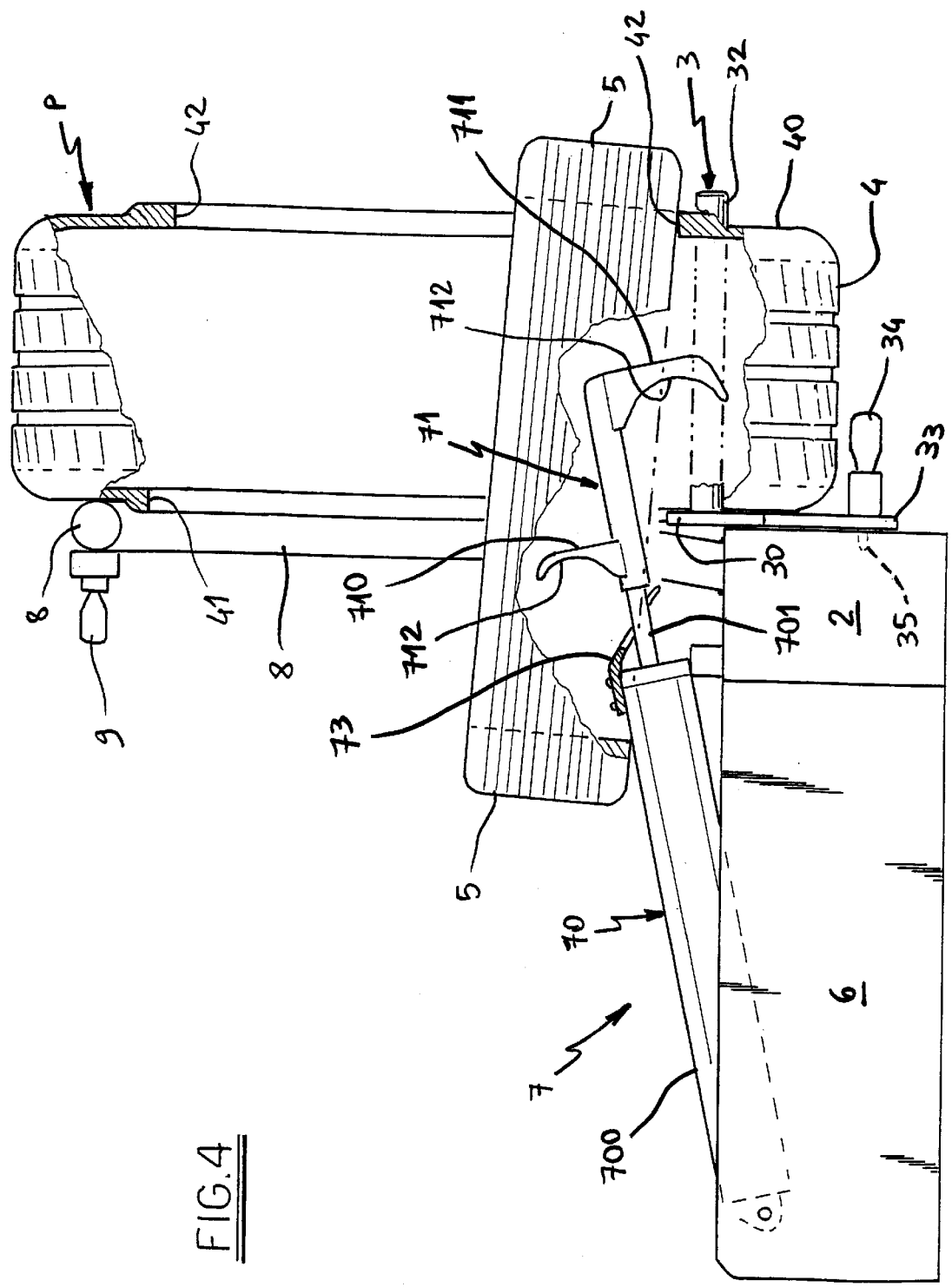
FIG. 4 is a partly cut-away side view of the device of the invention during the of the extraction of the toroidal ring from the outer carcass of the tire.

In greater detail, with reference to FIGS. 1 and 3, said support means 3 for the tire P comprise two equal bars 30 and 31, one end of which is hinged to the base 2 and presents a toothed portion 300. The toothed portions 300 of the two bars 30 and 31 mutually engage so that rotating one of the bars causes the other to rotate. The two bars 30 and 31 support at their free end two cylindrical pins 32 on which the tread of the tire P rests. To the bar 30 there is also fixed a plate 33, to the free end of which there is fixed a catch 34, the locking element 35 of which can be inserted into a series of holes 36 in the base 2, which are aligned along a circumferential arc.

The means 7 for the extraction or insertion of said ring 5 comprise a pneumatic cylinder-piston unit 70, the casing 700 of which is hinged to the rod 6 by usual means, and which is free to rotate about its hinge point.

It should be noted that the axis of said cylinder-piston unit 70 lies in the plane passing through the center of said carcass 4.

The rod 701 of the cylinder-piston unit 70 carries at its free end a profiled tool 71 comprising two appendices 710 and 711 which present a concave portion 712 for gripping said ring 5.

To the free end of the casing 700 there is fixed a fork-shaped member 73 against which the top of said ring 5 rests during its extraction from the carcass 4 of the tire P. Essentially, said member 73 prevents the ring 5 from jamming between said rod 701 and said casing 700.

The device 1 of the invention is operated via a switch 9, by which the operator controls its operation.

Before describing the operation of the invention it should be noted that the edges 41 and 42 of the carcass 4 of the tire P have different diameters at their beads.

FIGS. 1 to 4 show the various operating stages involved in extracting the ring 5 from the carcass 4 of the tire P.

With reference to the figures, the operator has firstly to place the carcass 4, carrying in its interior the ring 5, on the pins 32, taking care to orientate the carcass 4 such that its larger diameter edge 41 faces the tubular element 8.

The operator then adjusts the height of the pins 32, i.e. the orientation of the bars 30 and 31, on the basis of the diameter of the tire P, so that the sidewall 40 of the carcass 4 of the tire P rests against the upper horizontal part of said tubular element 8. Having determined the correct height, the bars are locked in position by the catch 34.

Figure 2:
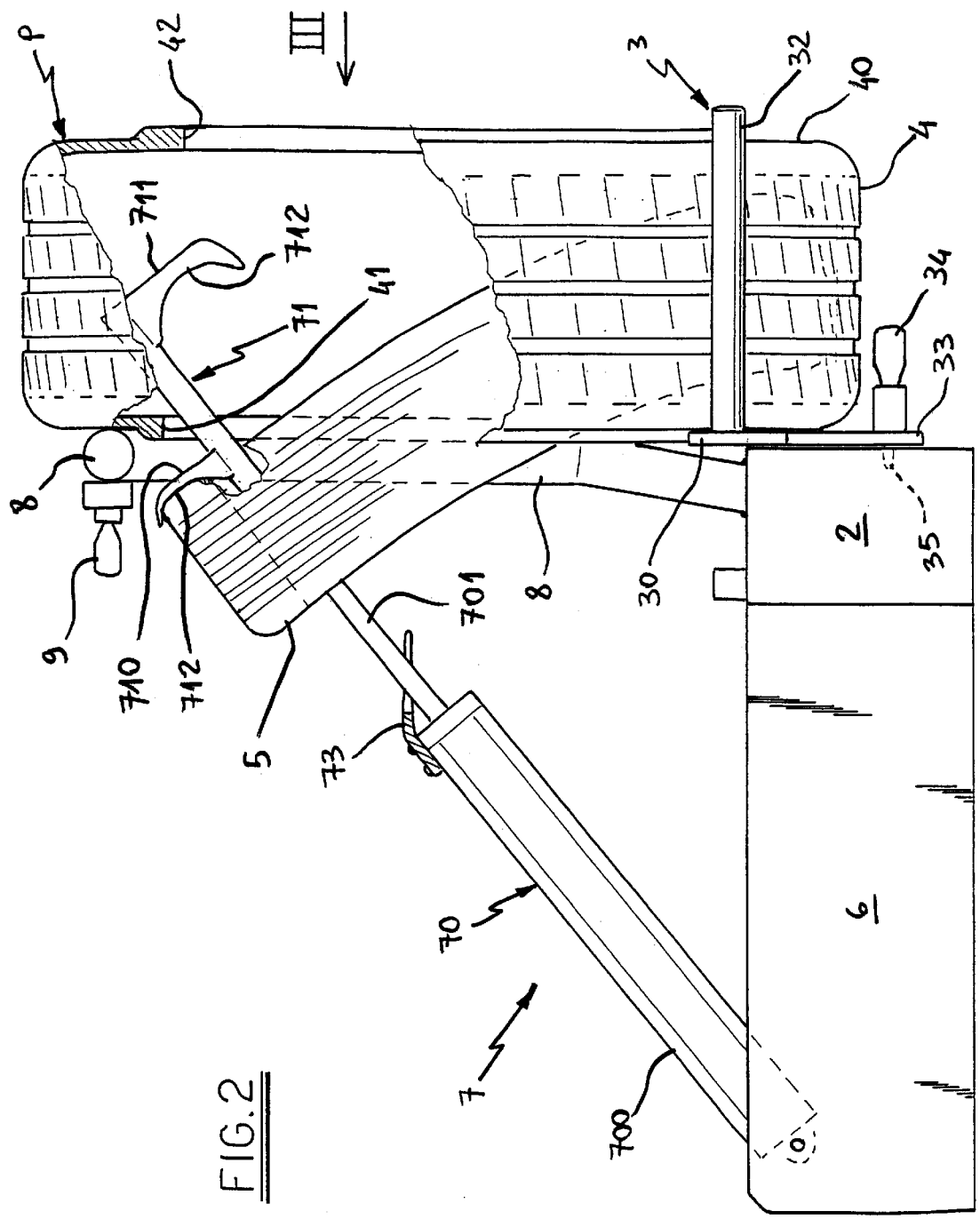
FIG. 2 is a partly cut-away side view of the device of the invention during the extraction of the toroidal ring from the outer carcass of the tire.

At this point, while supporting the casing 700, the switch 9 is operated to cause complete extraction of the rod 701 from the casing 700 of the cylinder-piston unit 70, so that the tool 71 passes through the central hole in the ring 5. The appendix 710 of the tool 71 is then positioned as shown in FIG. 1 and the rod 701 made to retract. By this means, the upper portion of the ring is extracted from the carcass 4 by deforming as shown in FIG. 2. By continuing to retract the rod 701, the ring 5 is brought into the configuration shown in FIG. 4, i.e. into a position substantially perpendicular to the carcass 4. From said position the operator can manually extract the ring 5 from the carcass without exerting any force.

Figure 5:
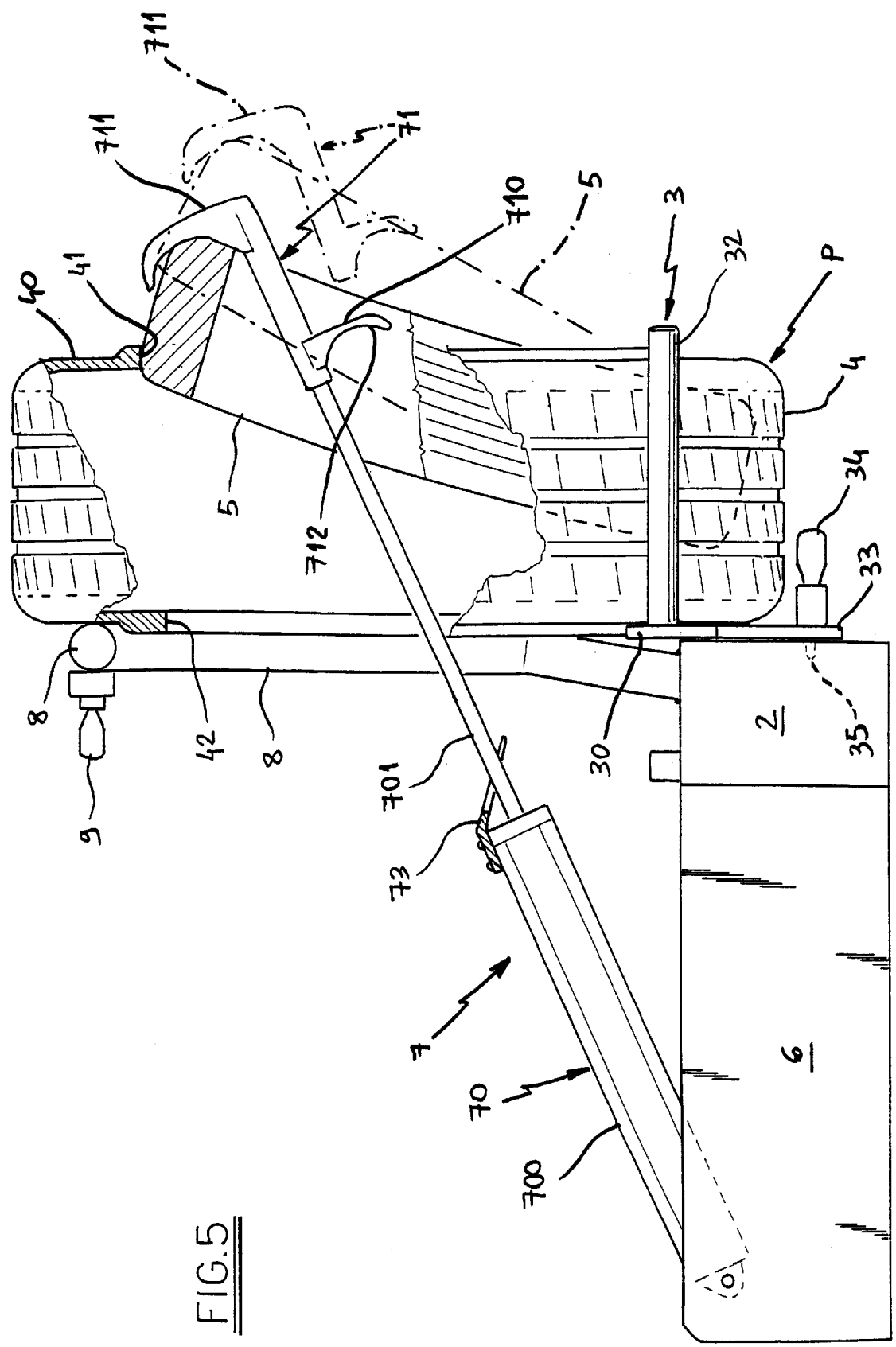
FIG. 5 is a partly cut-away side view of the device of the invention during the insertion of the toroidal ring into the tire carcass.

FIGS. 5 and 6 shown the operating stages involved in inserting the ring 5 into the carcass 4 of the tire P.

For this purpose the operator has firstly to position the carcass 4 on the pins 32, taking care to orientate it such that its smaller diameter edge 42 faces the tubular element 8.

Having rested the carcass 4 on the pins 32, the operator positions it at the correct working height by orientating the bars 30 and 31, and locks them in the correct position by means of the catch 34, so that the sidewall 40 of the carcass 4 of the tire P rests against the upper horizontal part of said tubular element 8.

The operator then inserts the lower end of the ring 5 into the central hole in the carcass 4, as shown in FIG. 5 with dashed lines, and then extracts the rod 701 of the cylinder-piston unit 70, so that the tool 71 passes through the hole in the ring 5. At his point the operator rotates the tool 71 through 180°, and hooks the appendix 711 of the tool to the upper edge of said ring 5, as shown in FIG. 5. By means of the switch 9 he then retracts the rod 701, which as it retracts inserts the ring 5 into to the carcass 4, as shown in FIG. 6.

What is claimed is:

1. A device for fitting an inner toroidal ring made of elastomer rubber to an outer carcass of a pneumatic tire having a tread and a sidewall, and for removing the inner toroidal ring from the outer carcass of the pneumatic tire, said device comprising:

a base;

supporting means for positioned on said base for supporting the outer carcass of the tire so that one side of the outer carcass rests on said supporting means and an internal edge of the ring is distant from said supporting means; and movable means for extracting the ring from the side of the carcass that rests on said supporting means, and for inserting the ring into the carcass through a second side of the carcass that is opposite to the first side, said movable means comprising one appendix that acts alone on one upper portion of the ring disposed in a horizontal position.

2. The device of claim 1, wherein said movable means comprise a cylinder-piston unit composed of a casing that is hinged to a support branching from said base and a rod that that has an axis and is provided with said one appendix for gripping the internal edge of the ring that is distant from said supporting means.

3. The device of claim 2, wherein said one appendix is associated with a tool that can rotate about the axis of said rod.

4. The device of claim 3, wherein said movable means has two appendices, of which one is used alone to extract the ring from carcass, and the other is used alone to insert ring into the carcass.

5. The device of claim 1, wherein said supporting means for the carcass are adjustable in height on the basis of the diameter of the carcass.

6. The device of claim 1, wherein said supporting means comprise two height adjustable pins on which the tread of the tire rests, and at least one abutment element against which a portion of the sidewall of the carcass rests.

7. The device of claim 6 said abutment element is an L-shaped tubular element supported by said base.

8. The device of claim 6, wherein said movable means comprise a cylinder-piston unit composed of a casing that is hinged to a support branching from said base and a rod that is provided with said one appendix for gripping the internal edge of the ring that is distant from said supporting means, and said cylinder-piston unit has an axis that lies in a plane that passes through the center of the carcass when the tire tread rests on said two height adjustable pins.

\* \* \* \* \*